April 23, 1935.  F. KRUEGER  1,998,724
FEED MECHANISM FOR CAN BODIES
Filed Aug. 25, 1932  4 Sheets-Sheet 1
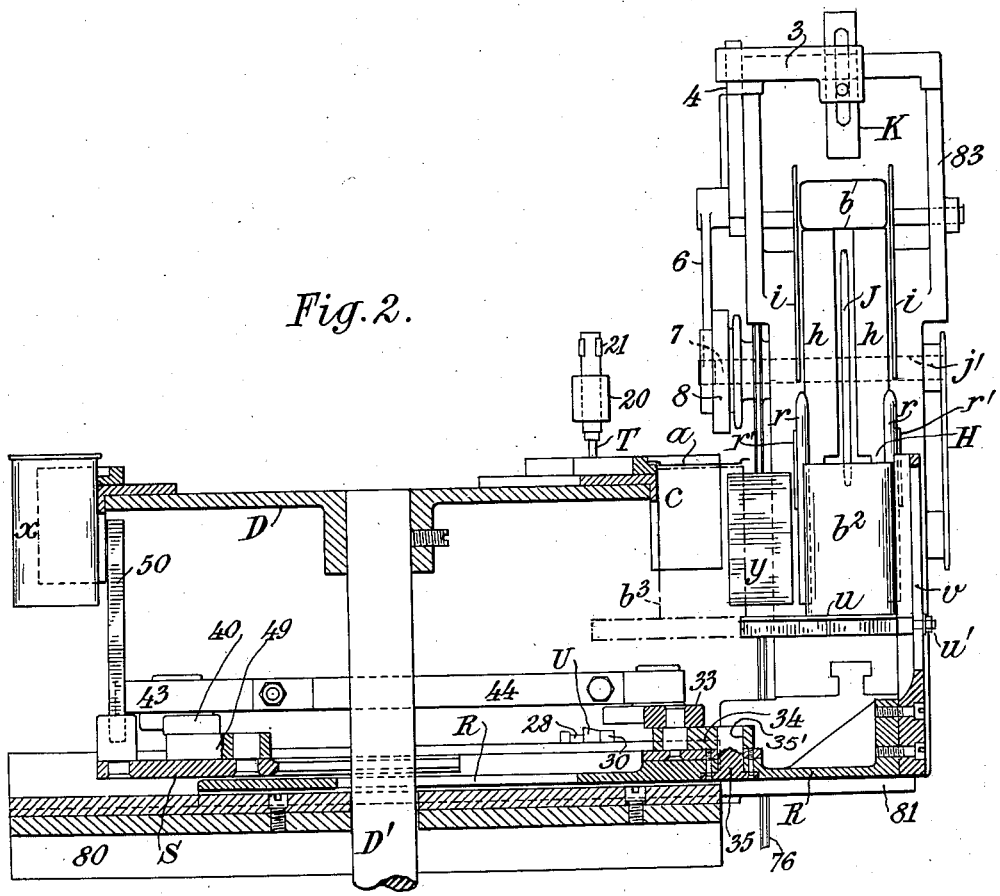
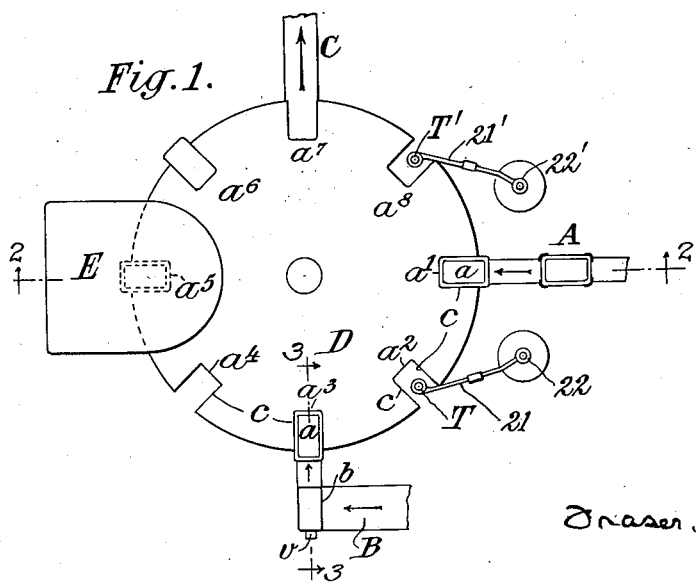
INVENTOR
Frank Krueger
BY
Fraser, Myers & Manley
ATTORNEYS April 23, 1935. F. KRUEGER 1,998,724
FEED MECHANISM FOR CAN BODIES
Filed Aug. 25, 1932 4 Sheets-Sheet 2
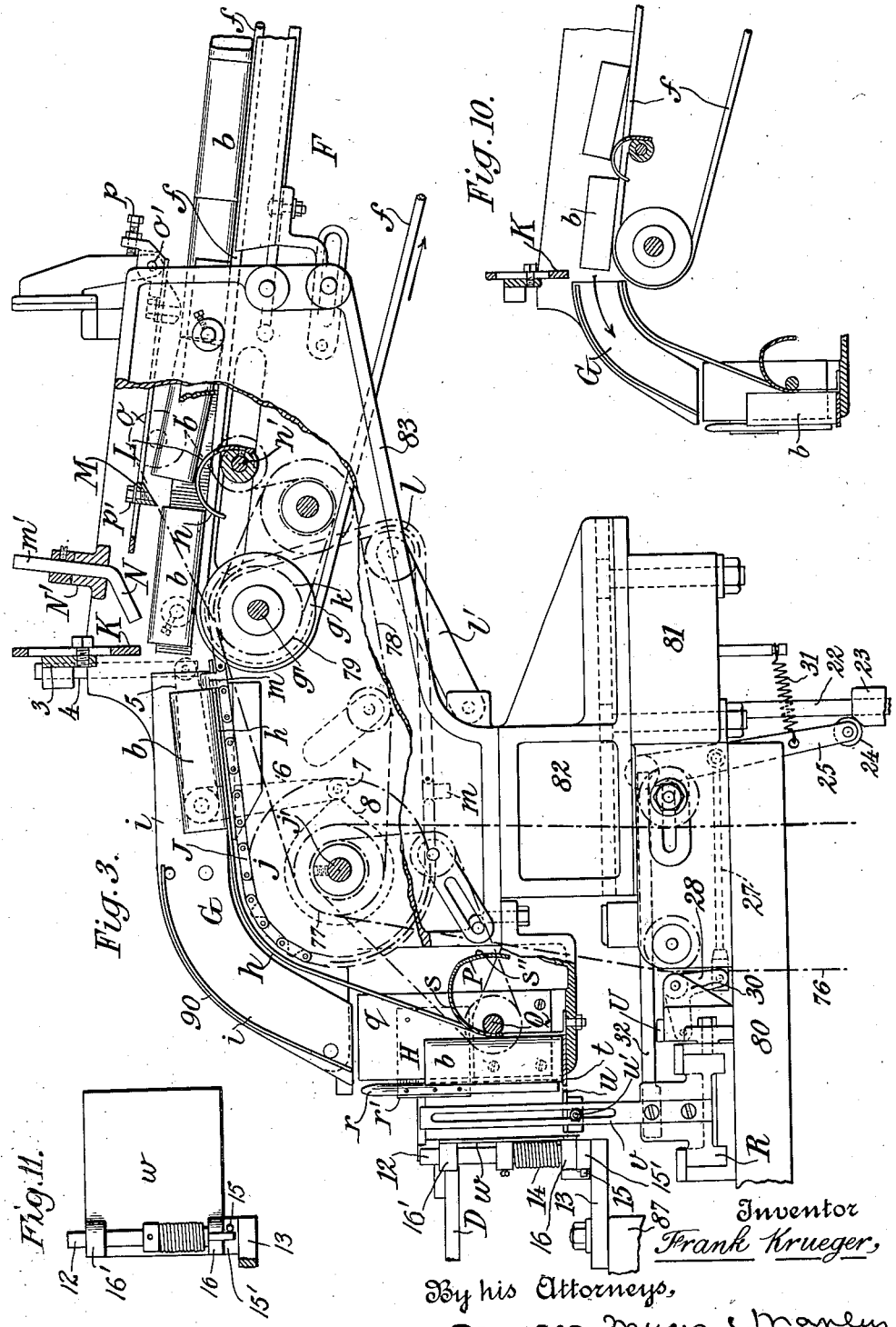
Inventor
Frank Krueger,
By his Attorneys,
Fraser, Myers & Manley

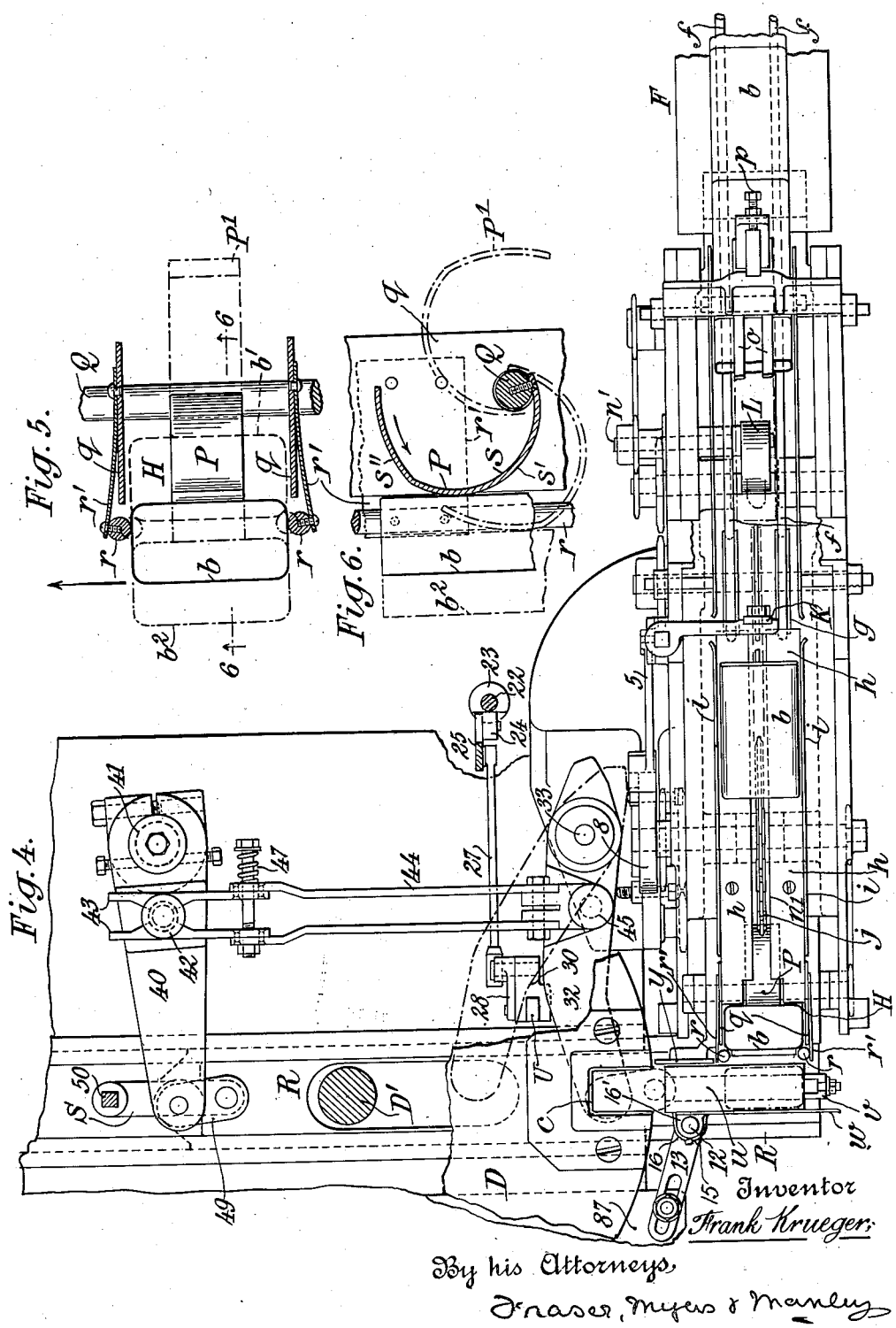

April 23, 1935.  F. KRUEGER  1,998,724
FEED MECHANISM FOR CAN BODIES
Filed Aug. 25, 1932  4 Sheets-Sheet 4
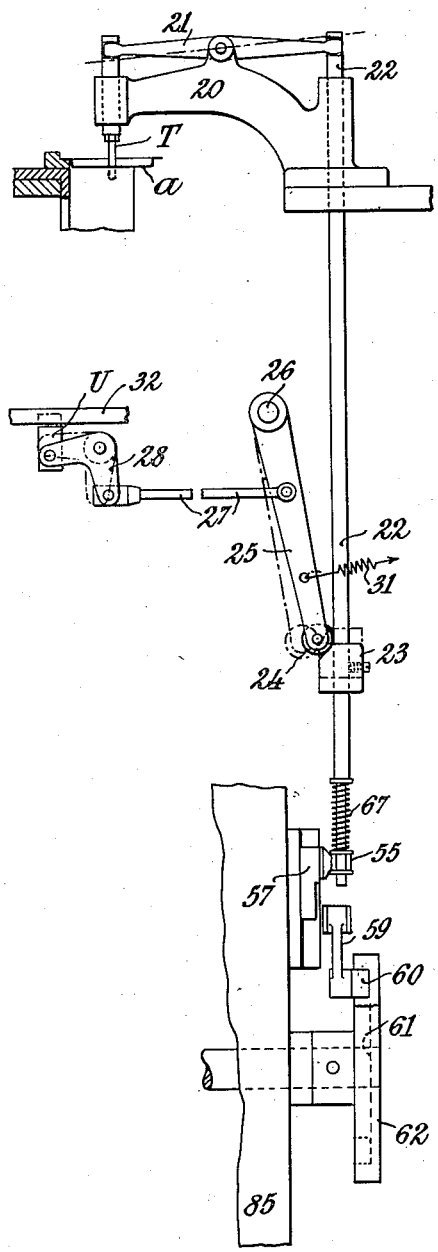
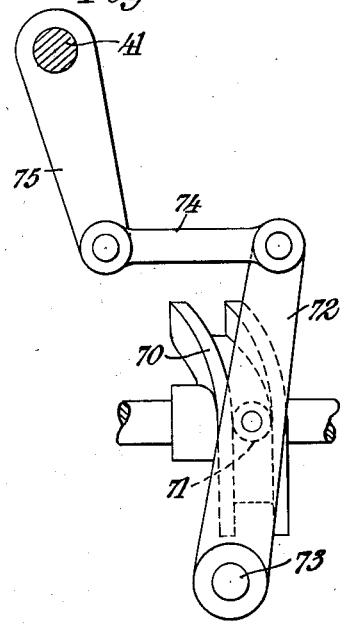
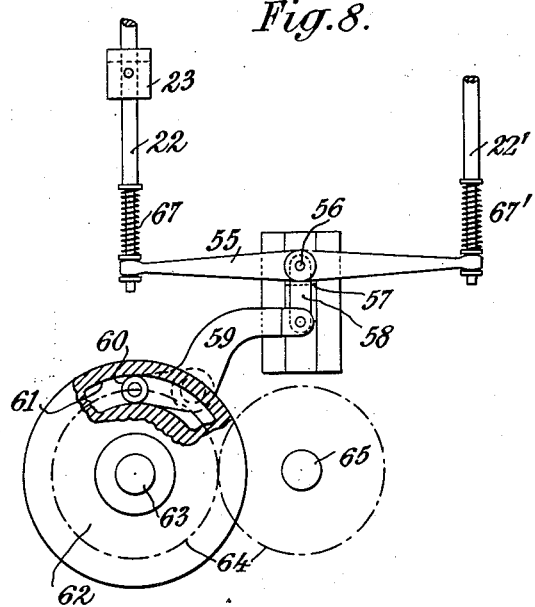
INVENTOR
Frank Krueger,
BY
Fraser, Myers & Manley
ATTORNEYS.

Patented Apr. 23, 1935

1,998,724

UNITED STATES PATENT OFFICE 1,998,724

FEED MECHANISM FOR CAN BODIES

Frank Krueger, Brooklyn, N. Y., assignor to E. W. Bliss Company, Brooklyn, N. Y., a corporation of Delaware Application August 25, 1932, Serial No. 630,370

27 Claims. (Cl. 113—115)

This invention relates to automatic feed mechanism for can bodies or like objects which is particularly adapted for conveying can bodies from a body-making machine and delivering such bodies in predetermined relationship to a heading machine wherein the usual head or end is seamed to the body. The invention is, however, applicable to a variety of other uses.

One object of the invention is to provide feed mechanism for automatically controlling the delivery of can bodies or the like so that they are timed to arrive at uniform intervals regardless of a random arrangement of the bodies as supplied to the feed mechanism.

The invention further aims to provide means for mechanically moving the bodies, which may be received in a position other than vertical, to such vertical position by gravitating action and without any mechanical means for moving them to such position, and for retaining such bodies in the vertical position and in accurate alignment with receiving means,—such as the pockets in the dial or revolving feed table of a seaming machine,—until the bodies are moved into said pockets.

A further object of the invention is to provide for automatically by-passing bodies beyond the machine to which they are normally fed should said machine not be in a proper condition to receive them, this arrangement for by-passing the bodies thus eliminating the necessity for shutting down the preceding machine which initially supplies the bodies.

Further objects of the invention reside in the novel construction and co-operation of parts, as will be made apparent from the following more detailed description.

As illustrating a type of machine to which the present invention is applicable, reference is made to the patent of Charles Gueritey (assignor to E. W. Bliss Company) for Feed mechanism for can heading machines, No. 1,747,626, granted February 18, 1930,—which illustrates a combination of mechanisms comprising a head or can end feed, a body feed, and an intermittently-rotating dial receiving the heads and bodies from such feeds and carrying them to head or end seaming mechanism, and an out-feed taking the headed cans from such dial and carrying them away.

As illustrating suitable constructions of can end seamers or headers such as are applicable for use with the present invention, reference is made to Gueritey Patent No. 1,666,239, granted April 17, 1928, and to Krueger Patent No. 1,923,101, granted August 22, 1933.

A suitable construction of can end feeder is shown in the Krueger Patent No. 1,962,645, granted June 12, 1934.

The accompanying drawings illustrate a preferred embodiment of the present invention, being applied to a machine especially adapted for operating upon can bodies having flat sides and ends with rounded corners and of a length somewhat greater than their width, it being understood that the machine by suitable modification or adjustment may operate upon a variety of other shapes of bodies.

Figure 1 is a diagrammatic plan showing the assembly of the various mechanisms of the entire machine for feeding the can ends and bodies, for seaming the heads and for delivering out the cans; this view corresponding in general to Fig. 2 of said Patent No. 1,747,626;

Fig. 2 is a vertical diametrical section taken in the general plane of the line 2—2 in Fig. 1;

Fig. 3 is partly a vertical section and partly a side elevation, the section being in the general plane of the line 3—3 in Fig. 1;

Fig. 4 is a fragmentary plan partly in horizontal section;

Fig. 5 is an enlarged horizontal section of a fragment showing the can body being expelled from the chamber which first receives it;

Fig. 6 is a vertical section on the same scale as Fig. 5, showing the same parts in the same position and corresponding to a fragment of Fig. 3 where the parts are at an earlier phase of the operation;

Fig. 7 is a sectional elevation viewed from the same side as Fig. 3 and illustrating the detector and body-feed stop mechanism;

Fig. 8 is a sectional elevation looking in the opposite direction to Fig. 2 and showing the same parts in the lower portion of Fig. 7;

Fig. 9 is a plan view of the under-portion of the mechanism showing the means for driving the out-feed slide;

Fig. 10 is a fragmentary view corresponding to Fig. 3 and showing the omission of certain elements; and Fig. 11 is an enlarged fragmentary view of the stop hinge for the movable wall $w$ viewed from the left in Fig. 3.

Referring first to Fig. 1, A is the reservoir holding the stack of can heads; B is the body feed; D is the conveyor or dial or turret for receiving the can heads $a$ from the head feed and can bodies $b$ from the body feed, the dial having notches forming pockets $c$, $c$ for receiving, respectively, the heads and bodies; E is the header or head seamer; and C is the out-feed for the seamed cans, which may be any suitable conveyor belt or chain. The dial D is shown as having eight pockets and is movable step by step one-eighth revolution at each movement. The head feed need not here be described, as it has no special relation to the present invention; for a suitable construction, reference may be had to the said Patents No. 1,747,626 and No. 1,962,645.

The head seamer E may be of any suitable construction of double seamer or other seaming mechanism, of which suitable examples are shown in said Patents No. 1,666,239 and 1,923,101.

The specific construction of the mechanisms thus referred to and the means for intermittently turning the dial have no necessary connection with the present invention and do not require to be illustrated or described.

In the operation of such combined mechanisms, as is well understood, the heads $a$ are successively fed to the dial from the head or can end feed, the pocket $c$ being in the position $a^1$ in Fig. 1, the head being received at the top of the pocket in the position shown in Fig. 2; after each head is thus fed, the dial moves to a detecting position $a^2$, and next to position $a^3$ where a can body $b$ is fed into the pocket beneath the head (see Fig. 2). The next movement of the dial carries the head and body to the idle position $a^4$, and the following movement to the position $a^5$ beneath the seamer E. In this, the seaming position, the can body is lifted by a plunger (not shown). In this lifting movement, the body,—being held in exact coincidence with the head,—engages and lifts the head, the two being carried up to the seamer chuck and there held while subjected to the action of the seaming dies. After seaming they are forced down by an ejector or knockout (such as the the knockout rod $v$ in said Patent No. 1,666,239), which disengages the can head from the chuck and the lifting plunger drops the seamed inverted can to the level shown at the left in Fig. 2 where the can is lettered $x$. The next movements of the dial carry the can $x$ through the idle position $a^6$ to the delivering position $a^7$, where it is ejected onto the out-feed conveyor C which carries it away. The next dial movement brings this pocket to the final position $a^8$, which is also a detecting position. In the positions $a^2$ and $a^8$ detectors or feelers are provided to determine whether in position $a^2$ a can head has been correctly fed to and is carried by the pocket, and in position $a^8$ to determine whether the pocket is properly empty or incorrectly carries a can head resulting from a misfeed of the appropriate body. These detecting operations and their results will be hereinafter described. For the description thus far, the same lettering has been employed (except for letter $x$) as in said Patent No. 1,747,626.

The present invention relates mainly to the body feed, which will now be described with particular reference to the other figures of the drawings.

The can bodies $b$, $b$ are carried into the machine by an in-feed F, which is shown as an endless belt or apron $f$ carried on pulleys $g$ on a shaft $g'$. Two parallel belts and pulleys are shown, although obviously a single wide belt or an apron might be substituted. Any equivalent in-feeding mechanism capable of conveying the can bodies from a body-making machine or other source of supply may be used. The in-feed delivers the bodies successively to a guiding shell or chute G, constructed preferably with a bottom plate $h$ and side plates $i$, $i$, the latter being suitably spaced to receive the can bodies $b$ freely between them for guiding them in their forward movement. The chute G at its upper or receiving end is or may be nearly horizontal, and as it progresses curves downwardly so as to discharge into a vertical chamber H adapted to receive the successive bodies in upright position. The movement of the bodies through the guiding chute G may be at first so nearly horizontal that they may require to be pushed and fed along, but later, as the chute descends, the bodies may fall by gravity.

To carry the bodies through this nearly horizontal portion, a transfer means J is provided, which is shown as an endless chain turning on suitable sprocket wheels or pulleys to give it motion and support it. These comprise a large driving sprocket $j$ carried on a transverse shaft $j'$, a supporting pulley $k$ loosely mounted on the shaft $g'$, and an idler pulley $l$, shown in dotted lines in Fig. 3, carried on a pivoted arm $l'$. The transfer chain J moves just beneath and parallel with the bottom plate $h$ of the chute G, and as the chain wraps around the sprocket $j$ it follows for a time the curve of the bottom of the chute as the latter descends from the horizontal toward the vertical, as clearly shown in Fig. 3.

For properly timing or spacing the successive can bodies, suitable means are provided adapted to hold back the incoming bodies carried by the in-feed and release them at proper intervals in which they are synchronously engaged by the transfer means (the chain J or any equivalent device), whereby they are successively carried into the chute and propelled therein far enough to insure their gravitating descent. For this purpose an intercepting stop K is provided which alternately drops down into the path of the oncoming bodies so as to intercept and stop the leading body, and lifts from such position so as to free the leading body and permit it to advance into the chute. This advance is preferably accomplished by its frictional contact with the in-feed belt $f$. As the advancing can body enters the chute, where it would come to rest were it not for some impelling means, it is engaged by a part of the transfer means to continue its forward feed through the chute. For this purpose the chain J is provided with suitably spaced feed projections or lugs $m$, $m$, which project upward from the chain sufficiently to strike the rear end of the can body and carry it forward. These projecting lugs pass up into a slot $n_1$ in the bottom $h$ of the chute, preferably formed by the bottom being made in two parallel sections leaving slot $n_1$ as a gap between them, as shown in Fig. 4. Thus each body in turn is pushed forward by the appropriate lug $m$ until it is carried into the descending portion of the chute, where its weight gives it sufficient acceleration, at which time the lug $m$ is disengaged from it, either by the body moving faster and leaving the lug or eventually by the lug, which moves around concentrically on the sprocket $j$, drawing out of the slot $n_1$. The chain J travels at a more rapid rate than the in-feed belts $f$ (being shown, in Fig. 3, as driving at approximately double the speed of the belts), the timing being such that each body is fed into the chute before the next following lug $m$ encounters it; so that, as the lug strikes it, it is advanced at the prescribed higher speed through the chute. This acceleration of the can bodies in the chute affords the proper time interval to permit of the operation of the spacing means afforded by the intercepting stop K. This stop is moved up and down in properly timed relation to the movement of the chain carrying the lugs m, m, by means which will be described later.

Inasmuch as the can bodies as carried by the infeed are open-ended tubes and are liable to enter slightly at their ends within one another and thereby become stuck together, it is important to have means for separating them to insure their being properly fed individually. For this purpose a separator L is provided, located to act preferably about one body-length back from the stop K and adapted to strike repeated upward blows, preferably in a backwardly inclined direction, against the undersides of the successive bodies so as to slightly lift them and thereby effectually jar them apart. The separator is preferably a curved yielding arm n, as clearly shown in Fig. 3, mounted on a transverse revolving shaft n' and moving preferably in a direction opposite to the advancing movement of the infeeding bodies. It is shown in Fig. 3 as having partly driven back and slightly lifted the body next in the rear of the one which has just before been arrested by the stop K. To hold back such following body, a stop M is provided, which is most simply made as a gravitating head mounted on a light arm o pivoted at o' and provided with an adjusting screw p by which the stop M may be set at varying heights. The underside of the stop is preferably beveled backwardly so that it will not obstruct the lifting movement of the advancing end of the body which is being thrown upwardly and backwardly by the separator L. To adapt the stop M to bodies of different lengths, it is made adjustable by means of a screw head p' along the arm o.

To prevent any accidental lifting of the can bodies upon striking the stop K, a guide N is provided, having an inclined face and which overlies the path of movement of the bodies, so that if the body projects up too high it will guide it down into its normal position as shown. This guide may be suitably constructed and mounted, the mounting shown consisting of a cross-bar N' to which it is fastened by a set screw.

The chamber H is constituted by parallel side plates q, q forming downward continuations of the side plates i, i of the chute G, and has a bottom plate t. The chamber H affords a space such as to freely but snugly receive the descending can body b, which enters it in the position shown in dotted lines at b' in Fig. 5. To hold the body from escape outwardly, it is received between rounded projections r, r mounted yieldingly upon the side walls q, q,—preferably by being carried on leaf springs r'. The rounded projections r are shown as rods fastened on the outer free margin of the leaf springs r'; but any suitable shape or construction of these rounded projections may be provided, the only essential being that they shall yieldingly project inwardly far enough to prevent any accidental escape of the can body as it drops into its upright position in the chamber H.

The fourth side of the chamber H is constituted by the expelling device or ejector P, by which subsequently the can body is forced out from the chamber H. While this ejector P might be variously constructed, it is preferably formed of a yielding plate s carried on a rotating shaft Q, as best shown in Figs. 5 and 6. Its position at the instant when the can body drops into the chamber H is approximately that shown in Fig. 3. The plate s has a spiral portion s' and a concentric portion s''; the spiral portion sweeps outwardly from its inner end, where it is attached to the shaft, and joins the circumferential portion. In operation the spiral portion encounters the can body b, which is dropped into the chamber H in the position shown in Fig. 3, and pushes it outwardly, as shown in Figs. 5 and 6, until it reaches the position shown in dotted lines at $b^2$ in these figures, at which time the concentric portion s'' is bearing against the rear face of the body, as shown in dotted lines in Fig. 6. It is the spiral portion s' of the plate which pushes the body forcibly out from the pocket by displacing outwardly the rounded projections r, r, in the manner shown in Fig. 5. The concentric portion s'' serves the purpose of a holding wall to keep the body in its outward position $b^2$ long enough to enable it to be fed from that position to the pocket in the dial. This rotary ejector P has the advantage over a stationary reciprocating plunger (such as has heretofore been used in machinery of this character for performing a similar operation), that it may be rotated continuously at uniform speed instead of having to be reciprocated, whereby it moves more steadily, and enables the machine to operate at higher speed.

As the can body is thus pushed outwardly from the chamber H, it slides off from the supporting bottom t onto a shelf u, which may be level therewith, as shown in Fig. 3, and which is carried on an upright member v mounted on a slide R. This constitutes the transfer mechanism for carrying the ejected body into the appropriate pocket c of the dial D. For this purpose the slide R moves transversely beneath the dial in a line preferably coincident with the diameter of the dial. It reciprocates at suitable time intervals for carrying the ejected body from the position $b^2$ (Fig. 2) into the pocket c, where it occupies position $b^3$; after which it reciprocates back to the starting position to receive the next can body from the chamber. The shelf u is adjustable in height by being fastened by a set nut u' movable up or down in a vertical slot in the upright v. To properly confine and guide the can body in these movements, a normally stationary wall w is provided to limit its ejecting movement under the impetus of the ejector P, and this wall is prolonged toward the ultimate position of the body in the pocket of the dial sufficiently to prevent any lateral displacement of the body during this movement; while on the opposite side of the shelf is mounted another stationary wall y, so that the body is confined in its transfer movement between these walls w and y. The wall w is preferably made adjustable, being mounted on a vertical post 12 which is held in an adjustable bracket arm 13. It may also be made yielding to perform another function, as hereinafter stated, but this is not necessary to the operation thus far described.

The machine as thus far described is capable of operation at high speed and with great exactitude. The can bodies, arriving on the infeed at a speed preferably slightly exceeding that for which the machine is set, are held back by the stop K, the advancing body being liberated at the proper instant by the lifting of this stop, while the following bodies are separated from it and are held back slightly by the operation of the separator L and holder M. The advancing body is fed forward frictionally into the chute until encountered by the more rapidly moving transfer lug *m* on the chain J, whereby the body is pushed rapidly through the chute until it is further accelerated by gravity and falls freely to the bottom of the chute, where it is received in the chamber H. Instantly thereafter the rotation of the ejector P pushes it out sidewise from the chamber on to the shelf *u* of the transfer means, and immediately thereafter an advancing movement of the slide R carries it forward into the pocket *c* which has been positioned by the dial to receive it. All of the active elements of the mechanism are rotary, except the timing stop K and the transfer slide R, which reciprocate in proper timing with the dial movements.

The timing stop K, as shown (see Figs. 2 and 3), is carried by an arm 3 on a vertical slide 4, the lower end of which is connected to a rearwardly-projecting arm 5 of an elbow lever having a downward arm 6 carrying at its lower end a roller 7 operated by a cam 8 on the transverse shaft *j'*. Since this shaft carries the sprocket *j* driving the chain J, the timing stop is necessarily moved in properly timed relation to the movements of the pushing lugs *m*.

The means for interrupting the body feed when a head has not been previously fed into the corresponding pocket will now be described. Referring to Fig. 1, the head is fed into the pocket in the position *a¹*, and the body to be united to this head is fed into the pocket when it reaches the position *a³*. In the intermediate position *a²*, a detector or feeler T (corresponding to that lettered J in said Patent No. 1,747,626) makes a descending movement in such position as to encounter the head if already fed into its proper place in the pocket, whereupon it is arrested in its movement and no further result ensues. If, however, the head was not fed into place, so that there is nothing to arrest the detector T, it descends through the pocket by an abnormal movement to a lower level, and this abnormal movement has the effect of stopping the feed of the body which would otherwise be fed into the pocket underneath the head, which would normally have been fed into place. The means for performing this stop-feed operation will now be described. Referring to Fig. 7, the detector T is a vertical pin reciprocating up and down in a supporting bracket 20 and jointed at its upper end to a lever or walking beam 21 fulcrumed at its middle on this bracket and jointed at its opposite end to a sliding rod 22 which passes down through the apparatus, as clearly shown in Fig. 7, and has fixedly attached to it a cam block 23. The parts are shown in Fig. 7 in the position reached when the detector T strikes the head *a* and is thereby arrested. In this position the cam block 23 has risen barely into contact with a roller 24 carried on the lower end of a lever 25 fulcrumed at 26 and which is connected by a link 27 with an elbow lever 28 having a horizontal arm which engages a vertically-moving bolt or lock U which is mounted to reciprocate in suitable guideways. These parts are also shown in Fig. 3. In the plan view, Fig. 4, the upper end of the locking bolt U is shown, being carried in a fixed bracket 30 attached to the frame of the machine and forming a pivotal bearing for the elbow lever 28. When this bolt U is in its lower position, as shown in full lines in Fig. 7, it produces no effect and the feed motions take place, as already described; but when the abnormal movement of the detector T (due to the absence of a head in the pocket) occurs, the cam block 23 lifts high enough so that its inclined cam face acts upon the roller 24 and throws back the lever 25 to the position shown in dotted lines in Fig. 7, thereby lifting the bolt U into the path of any suitable moving part connected to the body feed. It may be retracted by a spring 31.

In the particular construction shown, this moving part is a lever 32 pivoted at 33 and connected at its outer end by a link 34 to the feed slide R, the connection, as shown in Fig. 2, being by means of a pin 35 passing upwardly through the slide R into a hole 35' in the link. The slide R derives its motion from an arm 40 on a vertical shaft 41, which is oscillated by cam mechanism, and which arm carries a pin 42 having a loose or yielding connection with a link 44, the other end of which engages a pin 45 forming a pivotal connection between this link and the lever 32. Thus normally the movements of the arm 40 are communicated through the link 44 to the lever 32 and thence to the feed slide R; but when the bolt U is moved up into the path of movement of the lever 32, the movement of this lever is stopped by impact against the bolt and the slip connection between the link 44 and the pin 42 of the arm 40 yields, whereby the body-feed movement is stopped. The slip connection shown consists of two cheek-pieces 43 having rounded hollows or notches embracing the pin 42 between them under the stress of a spring 47, which may be adjusted to give the desired cling such as will operate the feed with certainty during normal conditions, while letting go when the bolt U is protruded to stop the feed movement. The advantage of this construction is that at the next ensuing swing of the arm 40, its pin 42 re-enters the recesses in the pieces 43 and reestablishes the normal connection,—so that at the next feed movement, if a head has been properly fed to that pocket, the corresponding body will then be fed into the same pocket beneath the head. This stop-feed means requires that the body which would normally have been fed in the pocket, but the feed of which is stopped by the arrest of the feed means, shall be ejected from its position on the shelf *u* of the transfer slide, as otherwise it would be crushed by the next emerging body which is forced out from the receiving chamber H. This ejection might be variously provided for, but in the construction shown the normally stationary wall *w* is made yielding, so that it may be pushed out of the way by the body to be ejected. For this purpose the wall *w* is pivoted upon the vertical post 12 and pressed to its normal position by a spring 14 which may be coiled around the post, as shown. In its normal position it is stopped by a stop pin 15. The spring has sufficient stress to hold the wall in its normal position as a stationary guide, but yields to permit the door to swing outwardly and release the rejected body at the next ejecting operation performed by the rotary ejector P. Thus when the feed slide R and its member *v* are not moved, the body which would normally be fed into the pocket of the dial D is expelled by displacing the yielding wall or door *w*. The hinged construction for the wall *w* is shown in detail in Fig. 11, where the stop pin 15 is mounted on a boss 15' fixed on the arm 13 and the door is mounted on hinged bosses 16, 16', the lower one 16 being formed with an abrupt face which abuts against the stop pin 15 when the wall *w* stands in its normal stationary position.

Adjacent the slide R is a delivery slide S which is mounted to reciprocate in slideways directly above the slide R, as shown in Fig. 2, and is driven by the swinging arm 40 already described through a connecting link 49. The slide S carries an upright post or finger 50 which is located at the pocket position $a^7$ in Fig. 1 and as it is moved with the slide S passes through a slot in the wall of the pocket and pushes out the headed can or body $x$ (Fig. 2), delivering it onto the out-feed C, which may be any suitable conveyor belt. This slide S makes one outward and inward reciprocation to each stopping position of the dial D, there being no occasion for any interruption of its movement.

Referring to Fig. 1, there is another detector T', constructed like the detector T and having the same movements, which is arranged to operate in the pocket position $a^8$. This is for the purpose of detecting the improper carrying around of a head in the pocket, which could occur in case of a misfeed of the body. In such case it is important to stop the head feed in order that a second head shall not be fed upon the one thus already in the pocket, as explained in said Patent No. 1,747,626. I have not here illustrated the means for operating the head feed stop under control of the detector T' as this forms no part of my present invention. For such feed stop reference may be had to my Patent No. 1,962,645, above referred to. As in that patent, the two detectors are moved up and down together. The detector T' is connected by lever 21' to the vertical rod 22' (identical with the rod 22), and these two rods are connected to a cross lever 55 (Fig. 8) fulcrumed at 56 on a vertically moving slide 57 (Figs. 7 and 8) which is connected by a link 58 to a lever 59 which carries roller 60 engaged in the cam groove 61 of a cam 62 which is fixed on a cam shaft 63 which is driven by gears 64 from a main drive shaft 65. The rods 22 and 22' pass freely through the ends of the lever 55 and are provided with springs 67, 67' through which the up and down movements of the lever 55 imparted by the cam are transmitted to the rods 22, 22' and thence to the detectors—all in a manner set forth in my said Patent No. 1,962,645. When either detector is stopped by contact with a head in the pocket, this arrests the upward movement of the rod 22 or 22' and the corresponding spring is compressed, the lever 55 rocking on its fulcrum.

For imparting the described swinging movements to the arm 40, any suitable driving mechanism may be employed. For this purpose, on either of the shafts 63 and 65 may be mounted a cam 70, the cam groove of which is engaged by a roller 71 on lever 72 fulcrumed at 73 and its free end connected by a rod 74 to a lever arm 75 fixed on the shaft 41—all as shown in Fig. 9.

The body feeding mechanism may be driven from any suitable power shaft beneath through a belt or chain 76 to a sprocket 77 fixed on the shaft $j'$. This shaft in turn, through a like sprocket, drives a chain 78 which communicates motion to a sprocket 79 on the shaft $g'$ driving the in-feed belt $f$. These means are illustrated as suitable drive connections, but such driving means are well understood by all machine designers.

The means for intermittently moving the dial D, which is carried as usual on a shaft D' (Fig. 2), is not shown as such means are well understood. Any suitable supporting framework is provided for the various moving parts. Said framework requires no special description as every constructor understands how to provide suitable framing in such machinery. It may be said, however, that a main base 80 may be provided, on which may be mounted a fixed support 81 (Fig. 3) and on this, through an adjustable bracket 82, may be mounted an overhanging frame or bracket 83 for supporting the body feed mechanisms. A lower frame or standard 85 (Fig. 7) may be provided, having bearings for the shafts 63 and 65 and a guideway for the slide 57. On any suitable part of the fixed frame may be provided a fixed portion 87 (Figs. 3 and 4) on which is clamped the adjustable bracket arm 43.

It is desirable to provide the chute G on its upper and outer side with one or more guide strips 90 (Fig. 3) to prevent any possible outward displacement of the can bodies in their descent.

It will be apparent that the specific features of construction and particular mechanical movements herein described and shown in the accompanying drawings are susceptible of a considerable amount of variation, according to the judgment of the constructor and depending upon the particular nature of the can bodies or other objects to be fed, and it is to be understood that such variations are within the intent of the present invention.

An example of such varied construction is shown in Fig. 10. In this figure the timing chain J is omitted, and the hood G is shortened and brought close to the stop K, with the result that upon the lifting of the stop K, the traction of the feed belts $f$ will throw forward the can body $b$ with sufficient force (considering the high speed at which the machine operates) to insure its reaching the descending portion of the chute before its energy is spent, whereby it progresses in a curved path, descending by gravity, and being deposited in the chamber H as before described.

What I claim is:

1. Can body feeding mechanism comprising an in-feed delivering successive bodies endwise, an inclined chute receiving the bodies down which the bodies descend by gravity, with a vertical chamber at its bottom receiving the falling bodies in upright position, means for spacing the delivery of the bodies from the in-feed to the chute in equal time intervals, ejecting means for expelling the bodies from said chamber, a transfer means receiving the bodies so ejected and carrying them into a pocket in a conveyor, and an intermittently-moving conveyor having pockets for receiving the successive bodies.

2. Can body feeding mechanism comprising an in-feed delivering successive bodies endwise, an inclined chute receiving the bodies therefrom and down which the bodies descend by gravity, with a vertical chamber at its bottom receiving the falling bodies in upright position, and ejecting means for removing the bodies from said chamber, the chamber having yielding portions to confine the body therein.

3. Can body feeding mechanism according to claim 2, the yielding portions of the chamber formed as yielding sides with confined projections to hold the body therein.

4. Can body feeding mechanism comprising a vertical chamber, means for dropping successive bodies into said chamber in upright position, said chamber having yielding sides between which the body is confined, and intermittently-acting ejecting means adapted to expel the successive bodies from between such yielding sides of the chamber.

5. Can body feeding mechanism according to claim 4, the ejector being a rotating pusher having a projection adapted in passing the chamber to enter it and expel the body therefrom.

6. Can body feeding mechanism according to claim 4, the ejector being a rotating part shaped to exert a cam action to push the body from the chamber.

7. Can body feeding mechanism according to claim 4, the ejector being a rotating part having a yielding portion shaped to exert a cam action to push the body from the chamber.

8. Can body feeding mechanism according to claim 4, the ejector being a rotating part shaped to exert a cam action to push the body from the chamber, and having a concentric portion to hold the ejected body.

9. In a can body feeding mechanism, an in-feed delivering successive bodies endwise in approximately horizontal position, an inclined chute receiving the bodies therefrom, down which chute the bodies descend by gravity, a vertical chamber at the bottom of the chute receiving the falling bodies in upright position, said chamber comprising upright confining walls between which the bodies are held, intermittently-acting ejecting means for expelling the bodies from said chamber at timed intervals, a transfer carrier, and a conveyor having pockets, the carrier receiving the body ejected from the chamber and delivering it into one of the pockets of the conveyor.

10. The combination defined by claim 9, in which the carrier has an open side which in its receiving position coincides with the delivery side of the chamber, and in which the expelling means is so timed that after ejecting the body into the carrier it will be caused to dwell and close the open side of the chamber until the carrier moves the body away from its receiving position.

11. In a can body feeding mechanism, an in-feed comprising a continuous, uninterrupted conveyor belt adapted to receive and convey can bodies placed endwise thereon in succession without respect to the relative spacing of the bodies along the belt, a chute including a portion inclined at an angle such that bodies may be caused to descend therethrough by gravity, a vertical chamber at the lower end of the chute to successively receive the can bodies as they descend and temporarily hold each of them in an upright position, ejecting means rendered effective at predetermined intervals of time for expelling bodies from the chamber, and transfer mechanism comprising means for positively feeding bodies received from the in-feed along the chute to the gravitating portion thereof, in a predetermined time relation in synchronism with the timing relation of the ejecting mechanism.

12. In can body feeding mechanism, an in-feed delivering successive bodies endwise, an inclined chute receiving the bodies down which the bodies descend by gravity, with a vertical chamber at its bottom receiving the falling bodies in upright position and means for expelling the bodies from the chamber, said in-feed comprising a traveling belt carrying the bodies, means for spacing the delivery of the bodies therefrom in equal time intervals, said spacing means comprising a stop intercepting the advancing body, and driving means for displacing said stop moving synchronously with the expelling means.

13. In can body feeding mechanism, an in-feed delivering successive bodies endwise, an inclined chute receiving the bodies down which the bodies descend by gravity with a vertical chamber at its bottom receiving the falling bodies in upright position, said in-feed comprising a traveling belt carrying the bodies, and means for spacing the delivery of the bodies therefrom in equal time intervals, with means for periodically breaking up the line of bodies carried by said belt.

14. In can body feeding mechanism, an in-feed delivering successive bodies endwise, an inclined chute receiving the bodies down which the bodies descend by gravity, with a vertical chamber at its bottom receiving the falling bodies in upright position, said in-feed comprising a traveling belt carrying the bodies, and means for spacing the delivery of the bodies therefrom in equal time intervals, with means for periodically breaking up the line of bodies carried by said belt, comprising a striker knocking them from beneath.

15. In can body feeding mechanism, an in-feed delivering successive bodies endwise, an inclined chute receiving the bodies down which the bodies descend by gravity, with a vertical chamber at its bottom receiving the falling bodies in upright position, said in-feed comprising a traveling belt carrying the bodies, and means for spacing the delivery of the bodies therefrom in equal time intervals, with means for periodically breaking up the line of bodies carried by said belt, comprising a rotating striker beneath the belt having an eccentric portion moving above the plane of the belt.

16. In a can body feeding mechanism, an in-feed delivering successive bodies endwise, an inclined chute receiving the bodies down which the bodies descend by gravity, with a vertical chamber at its bottom receiving the falling bodies in upright position, said in-feed comprising a traveling belt carrying the bodies, and means for spacing the delivery of the bodies therefrom in equal time intervals, with means for periodically breaking up the line of bodies carried by said belt, comprising a rotating striker beneath the belt turning oppositely to the travel of the belt to push the bodies backwardly.

17. Can body feeding mechanism comprising an infeed delivering successive open-ended bodies endwise in horizontal relation, with striking means for periodically breaking up the line of bodies and for separating them if telescoping has occurred, and a yielding holder above the line of bodies, adapted to engage the successive bodies after the action of said breaking up means.

18. Can body feeding mechanism, comprising a conveyor delivering successive open-ended can bodies endwise in horizontal relation, with means for periodically breaking up the line of bodies and for separating them if telescoping has occurred, comprising a striker knocking them from beneath.

19. Feeding mechanism according to claim 18, with a yielding holder adapted to engage the successive bodies after the action of said breaking up means, comprising a weighted head located above the line of bodies, having an inclined lower side facing the line of feed and mounted on a support yieldable vertically.

20. Can body feeding mechanism comprising a rotating conveyor having pockets for receiving heads and bodies, a body receiving chamber and means for depositing successive bodies therein, a transfer carrier for carrying the bodies from said chamber to the pockets of said conveyor, a detector movable into the successive pockets to determine the presence therein of a pre-fed head, and means operable upon the abnormal movement of said detector to stop the transfer of a body to the conveyor pocket and thereby to prevent the feeding of a body into a pocket to which no head has been fed.

21. Mechanism according to claim 20, with means for arresting the transfer carrier connected to be operated by the abnormal movement of the detector.

22. Mechanism according to claim 20 with a stop for arresting the transfer carrier, said stop connected to be operated by the abnormal movement of the detector.

23. Mechanism according to claim 20, said body receiving chamber having an ejector for expelling the body therefrom to the transfer carrier, and yielding means for discharging a body when the transfer to the conveyor pocket is stopped.

24. Mechanism according to claim 20, said body receiving chamber having an ejector for expelling the body therefrom to the transfer carrier, and a yielding plate adapted to normally guide the body received by the carrier and to yield and permit the discharge of a body when a second body is expelled from the chamber.

25. Can body feeding mechanism comprising a rotating conveyor having pockets for receiving heads and bodies, a body receiving chamber, a transfer carrier for carrying the bodies from said chamber to the pockets of said conveyor, a reciprocable operating part and a disconnectible connection from said part to said transfer carrier for imparting to the latter its normal movements, a detector movable into the successive pockets to determine the presence therein of a pre-fed head, and a stop operable upon the abnormal movement of said detector to arrest the movement of said transfer carrier, said disconnectible connection yielding to permit such stoppage.

26. Can body feeding mechanism according to claim 25, said disconnectible connection having mutually inclined faces adapted to re-establish normal connection at the next ensuing movement of the operating part.

27. Can body feeding mechanism according to claim 20, with a normally reciprocating rod connected to operate the detector, can mechanism for normally reciprocating said rod, a yielding connection between said mechanism and the rod, a cam carried by the rod, said stop means comprising a movable bolt, and mechanism between said bolt and the said cam whereby upon the movement of said cam corresponding to the abnormal movement of the detector to communicate movement through said connecting mechanism to project said bolt into position to stop the transfer of a body.

FRANK KRUEGER.